Dec. 11, 1973   J. L. ABBOTT   3,778,321
APPARATUS FOR MAKING ROLLED COLLAPSIBLE CONTAINER
HAVING PLASTIC OUTSERT
Filed Oct. 14, 1971   2 Sheets-Sheet 1

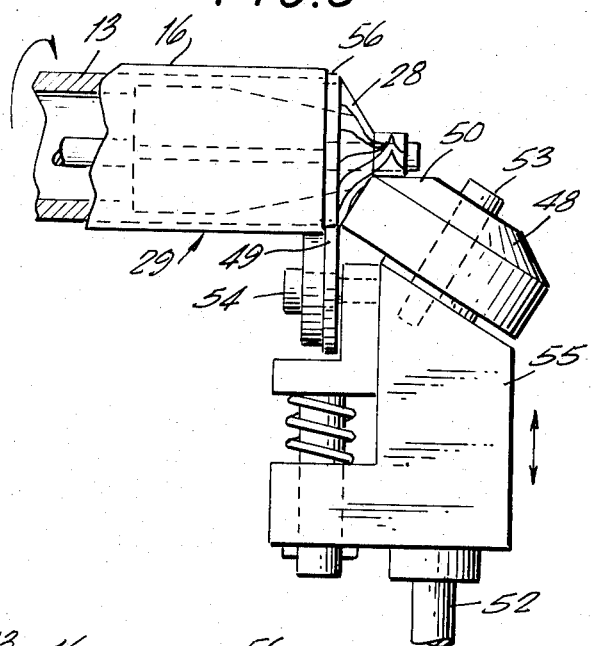
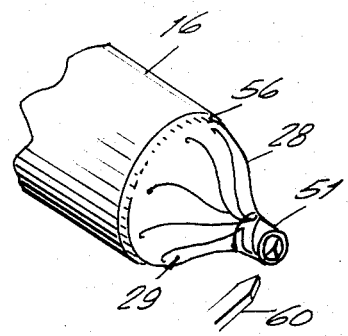
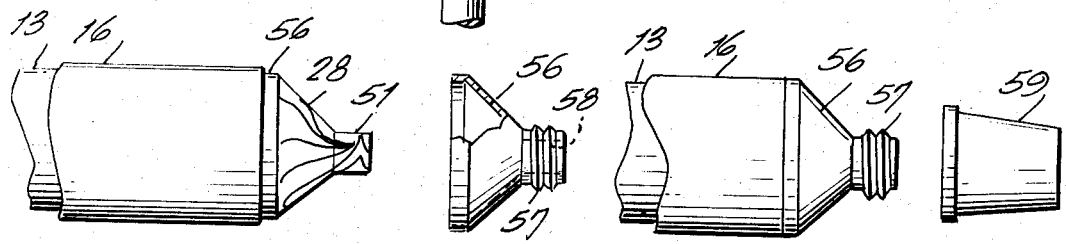
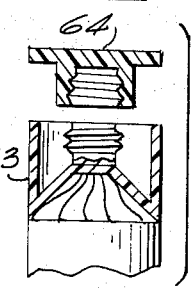
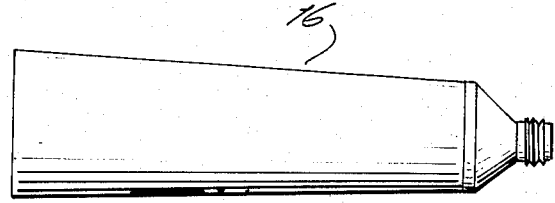
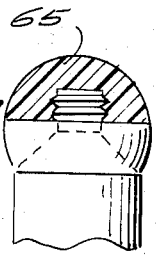

United States Patent Office 3,778,321
Patented Dec. 11, 1973

3,778,321
APPARATUS FOR MAKING ROLLED COLLAPS-IBLE CONTAINER HAVING PLASTIC OUTSERT
Joseph L. Abbott, Loveland, Ohio, assignor to Victor Metal Products Corporation, Cincinnati, Ohio
Filed Oct. 14, 1971, Ser. No. 189,083
Int. Cl. B29c 27/00; B65b 7/14
U.S. Cl. 156—446
16 Claims

ABSTRACT OF THE DISCLOSURE

A collapsible container body is formed by sealing the longitudinal margins of a rolled length of a thin sheet of suitable material. One end of the container body is preformed and then folded into a shoulder and neck configuration. An outsert having the desired shape is slipped over the formed end of the container and secured thereto. A wide variety of container shapes can be formed using simplified apparatus.

BACKGROUND OF THE DISCLOSURE

Collapsible containers such as tubes forme of laminates, of metal and plastic as well as thin sheets are well-known in the packaging field. Such articles have been described in patents such as United States Letters Patent No. 2,411,244 and 3,260,777. These prior art containers, however, have received limited acceptance because of the difficulty of forming a satisfactory neck and shoulder structure on the dispensing end of the container.

Prior art devices often leaked or burst where the shoulder structure met the container body. Where the container was made of one material and the shoulder and neck of another, deterioration of the contents due to chemical action often occurred. In addition, the methods of manufacture of previously known containers of this type did not lend themselves to economic mass production.

Accordingly, it is an object of the present invention to provide a collapsible container free of the disadvantages of prior art devices.

Another object of the present invention is to provide a laminated collapsible tube in which the material of the tube body is continuous throughout the tube, extending through the shoulder and neck portion.

A further object of the present invention is to provide a collapsible container which lends itself to economical mass production.

Still another object of the present invention is to provide a method for producing collapsible containers more inexpensively and in a wide variety of sizes and shapes.

SUMMARY OF THE INVENTION

In one embodiment of the present invention an elongated strip of a thin sheet material consisting of a thin foil of metal such as aluminum and a suitable layer of a plastic material on each side thereof is wound upon a mandrel to form a tubular body and its overlapped margins sealed together. A series of longitudinal flutes are formed in the tube end on a spindle slidably carried within the free end of the mandrel. The spindle is then retracted and the fluted end thus formed is folded into the desired tube shoulder and neck configuration. A plastic outsert having the required finished shape may be slipped over the thus formed tube end and secured thereto, to improve or vary the container. Variously shaped mandrels and outserts make it possible to produce a wide variety of container shapes.

DESCRIPTION OF THE DRAWINGS

In the accompanying drawings forming part hereof, indentical parts have been given the same reference numerals, in which;

FIG. 8 is a view in side elevation of the neck and shoulder folding portion of the present invention.

FIG. 9 is a somewhat isometric view of the formed end of the container.

FIG. 10 is an exploded view in side elevation of the formed end of the container and an outsert therefor.

FIG. 11 is a view similar to FIG. 10 with the outsert in place and a closure member for the end of the outsert.

FIGS. 12 and 13 are views in cross section of alternate forms of container bodies according to the present invention.

FIG. 14 is a view in side elevation of a container having a somewhat conical body, a further embodiment of the present invention.

FIGS. 15 and 17 are elevational views of alternate outserts according to the present invention.

GENERAL DESCRIPTION

Figure 1:
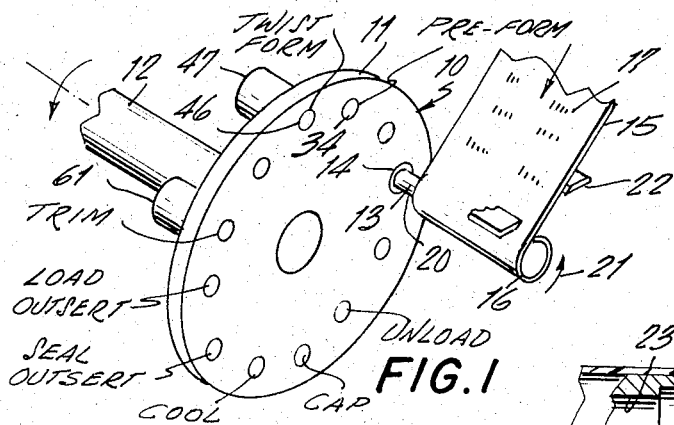
FIG. 1 is a somewhat isometric, fragmentary view, greatly simplified for the sake of clarity of the tube body forming portion of the present invention.
Figure 2:
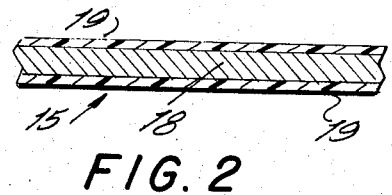
FIG. 2 is a cross sectional fragmentary view, greatly enlarged, of one form of sheet material useful in the present invention.

Referring to the drawings and particularly to FIGS. 1 and 2, 10 indicates a container forming apparatus having a heavy metal plate 11 secured to a rotatable main shaft 12. The shaft 12 is coupled by suitable gearing to a source of rotary power such as an electric or hydraulic motor (not shown).

A plurality of mandrels 13, only one of which is shown for the sake of clarity, are freely journaled in bearing 14 carried by the plate 11 and extend outwardly thereof. The mandrels 13 are of the same shape as the body of the container to be formed and have an outside diameter slightly smaller than the inside diameter of the said container.

As shown in FIG. 1, a strip of some suitable thin sheet material such as metal, plastic, waxed paper, or plastic coated metal 15 may be used to form the container body 16. The sheet material may be decorated as indicated at 17 while in its flat state so that no further decorating steps will be required in finishing the container. One preferred type sheet material is shown in FIG. 2 and consists of a central layer of metal 18 such as aluminum, zinc, lead, or the like and a layer 19 of plastic such as polyethylene on each side thereof.

The sheet material 15 is fed on to a mandrel 13 at the first or loading station 20. Vacuum means (not shown) acting within the mandrel 13 through ports in the mandrel (not shown) may be used to hold the sheet material upon the mandrel 13 as it is slowly rotated in the direction indicated by arrow 21. Alternately, rollers (not shown) may be used to direct and hold the sheet material around the mandrel at this stage.

Shears, indicated at 22 in FIG. 1 are employed to cut the sheet material 15 along a line which will cause its margins to overlap upon the mandrel 13. Heat sealing by induction heating or any other suitable process then employed to form a fluid tight seam in the container body. If the metal layer 18 is covered with a plastic which will adhere to itself in the presence of heat the seam may be sealed in this manner. It will also be apparent that if the metal layer is not so coated a thin band of some suitable adhesive may be placed upon the metal 18 at the required intervals to provide the sealed seam upon the application of heat. Very rapid sealing and therefore satisfactory production speeds have been achieved using heat sealing and well-known plastics such as polyethylene for this purpose.

Figure 3:
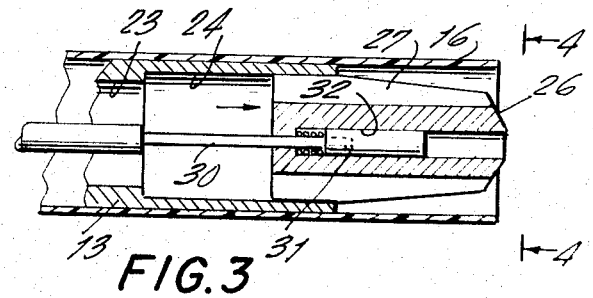
FIG. 3 is a fragmentary view in cross section of the neck and shoulder forming end of a mandrel according to the present invention.
Figure 4:
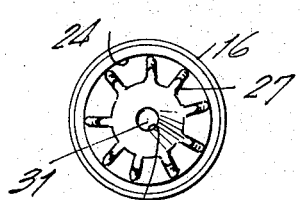
FIG. 4 is an end view taken on line 4—4 in FIG. 3 looking in the direction of the arrows.
Figure 7:
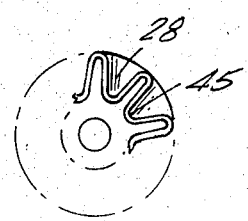
FIG. 7 is an end view taken on line 7—7 of FIG. 6 looking in the direction of the arrows.
Figure 5:
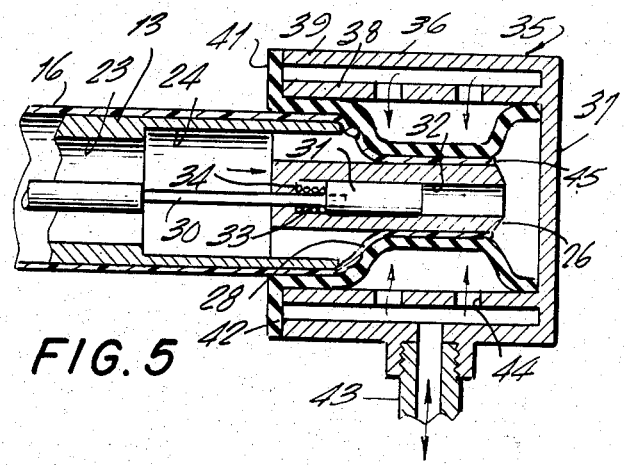
FIG. 5 is a view in longitudinal section of the preforming apparatus according to the present invention.
Figure 6:
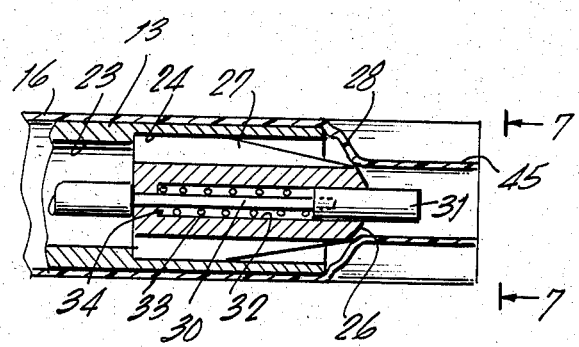
FIG. 6 is a view similar to FIG. 5 with the preforming chamber removed.

The mandrels 13 are hollow as shown at 23 in FIGS. 3, 5 and 6 and provided with an enlarged bore 24 at their outer or free ends. A spindle 25 is slidably carried within the enlarged bore 24 of each of the mandrels 13. The spindle 25 is beveled at its outer end as shown at 26 and provided wtih a series of equally spaced longitudinal flutes 27 as shown in FIG. 4. The bevel 26 conforms to the taper of the shoulder 28 of the container 29 (see FIGS. 6, 8 and 9).

In its extended position, the end of the spindle 25 projects beyond the end of the mandrel and underlies the outer end of the container body 16 as shown in FIG. 3. The spindle 25 may be advanced by fluid pressure applied through the mandrel bores 23, 24 or by means of an elongated sleeve (not shown).

An elongated rod 30 is carried within each mandrel 13 and supports a pin 31 on the outer end thereof. The pin 31 is freely and longitudinally movable within a two diameter axial bore 32 in the spindle 25. A coil spring 33 is disposed around the rod 30 within the larger diameter portion of the bore 32 between the pin 31 and the step 34 formed where the larger and smaller bores meet. The coil spring 33 urges the spindle 25 toward the retracted position at all times.

When the container body seam is secure the disc 11 is rotated bringing the container body 16 into the next or preforming station 34. At this station, the spindle 25 is in its advanced position (see FIG. 1) and the coil spring 33 compressed. A pre-forming chamber 35 is next slipped over the end of the mandrel 13 as shown in FIG. 5.

The pre-forming chamber 35 consists of a double walled cylinder 36 having an end wall 37 closing the outer end thereof. The inner wall 38 of the double walled cylinder is spaced from the outer wall 39 to provide an annular space 40 therebetween. An elastomer ring 41 is slipped within the pre-forming chamber 35 and is secured at one end across the open end 42 of the chamber and at its other end to the inner wall 38 adjacent the end wall 37. The elastomer ring 41 is thus unsupported over the major portion of its length within the pre-forming chamber 35.

In the operation of the pre-forming chamber, air or fluid under pressure is led into the annular space 40 between the walls 38, 39 through a fitting 43. Openings 44 in the inner wall 38 permit the fluid to pass through the inner wall 38 and compress the elastomer ring 41 in the manner shown in FIG. 5. As the elastomer ring compresses, it forces the material of the container body against the spindle 25 thereby causing the end of the container body to take the fluted configuration of the spindle. When the fluid pressure is released, the elastomer returns to its initial ring shape the chamber 35 retracted and the pre-formed container is advanced upon its mandrel to the next or fold-forming station.

The pre-forming of the container body insures the uniformity and repeatability of the fold-forming operation. Without preforming the container body would be subject to random creasing during the fold-forming operation resulting in high speed production difficulties.

As the mandrel is indexed to the fold-forming station, by the rotation of the plate 11, the spindle 25 is retracted from the position shown in FIG. 3 to that shown in FIG. 6. Retraction of the spindle 25 may be accomplished by release of the fluid pressure or by cam means in accordance with well-known mechanisms. As the force advancing the spindle 25 is released, the coil spring 33 retracts it. The spindle is retracted to a position where its outer bevel 26 defines the location of the container shoulder. The pin 31 now extends beyond the spindle 25 and into the reduced portion 45 of the container body formed by the elastomer ring 41.

The mandrel 13 in the fold-forming station 46 is rotated rapidly by means of any suitable source of rotary power such as the motor 47. Mandrel speeds of the order of 400 r.p.m. have been found satisfactory for this purpose. Two forming rollers 48, 48 are brought into contact with the pre-formed end of the container body 16 as it rotates with the mandrel 13.

The roller 48 is beveled as indicated at 50 to conform to the angle between the shoulder 28 of the container body and the neck portion 51. Hydraulic means, generally indicated at 52 in FIG. 8, slowly advances the roller 48 against the container body thereby causing it to fold upon itself upon the underlying mandrel, spindle and pin 31. The rollers 48, 49 are made of resilient material such as nylon, natural or synthetic rubber and are freely carried upon shafts 53, 54. The shafts 53, 54 are in turn secured to a support block 55.

The roller 49 is carried normal to the longitudinal axis of the mandrel 13 and in line with the end thereof. The roller 49, as best shown in FIG. 8, is narrow and serves to form a small step 56 between the shoulder 28 and the cylindrical portion of the container body.

At the end of the fold-forming step, the container body will have the form shown in FIG. 9. The plate 11 is next rotated to a trimming station where excess material may be trimmed from the neck 51 of the container by a knife 60 while the mandrel is rotated by motor 61. Careful twisting operations, however, can eliminate this step.

An outsert 56 is fitted over the end of the container body at the next station to which the plate 11 is indexed. The outset may be made of any suitable material such as metal or plastic. The outsert is hollow and in the form of the finished neck and/or shoulder of the container. The outsert neck may be threaded as shown at 57. The neck 51 of the container body 16 preferably extends for the complete length of the bore 58 in the outsert 56.

The wall thickness of the outsert 56 is such that a small skirt portion 29 thereon forms a continuous surface with the cylindrical portion of the container body as it slips into the step 56 formed by the roller 49. The step 56 also provides additional surface for the next operation which is the sealing or bonding of the outsert to the container.

At the next indexing of the plate 11, heat is applied to the container at the outsert end thereof to seal the outsert firmly to the container. If the material of which the outsert is made is properly selected a secure bond can be achieved by the mere application of heat. Alternatively, some suitable bonding material may be applied to the surface to be joined.

After the outsert sealing step the plate 11 may be indexed one step for cooling following which a closure member 59 may be threaded upon the end of the outsert 56.

While the foregoing description has been directed to containers having a cylindrical body, it will be apparent that the present invention makes it possible to form containers in a wide variety of shapes. Thus, for example, in FIG. 12 there is shown a container body with a triangular cross section. Such a container could be manufactured in accordance with the teachings of the present invention by using a triangular mandrel instead of the cylindrical one. Alternatively, the rectangular shape shown in FIG. 13 can be formed on a correspondingly rectangular mandrel. A conical container such as is shown in FIG. 14 can be formed on a conical mandrel with suitable adjustment of the seam width to provide sufficient overlap.

The containers disclosed herein can be provided with a wide variety of outserts to receive a closure, as shown in FIGS. 15–17.

FIG. 15 illustrates a somewhat tubular outsert 66 externally threaded as indicated at 62. The outsert 66 has a cylindrical bore which slips over and is bonded to the folded neck 51 of the container body.

FIG. 16 shows an outsert similar to that shown in FIG. 10 to which has been added a cylindrical skirt 63. A flanged closure member 64 cooperates with the skirt 63 to provide an ornamental cylindrical configuration on the container.

FIG. 17 illustrates a somewhat spherical closure and outsert structure 65.

Containers such as are described herein are filled from the end opposite the closure end and thereafter crimped together in the well known manner to enclose the contents.

From the foregoing it will be seen that there has been provided apparatus and a method for manufacturing containers from a sheet of material without the need for extruding metal or moulding plastic material for the container body. The process lends itself to large scale continuous operations with substantial savings over prior art methods. In addition, novel decorating techniques can be employed for the containers because the material of which the containers are made are decorated while in a flat state.

Having thus fully described the invention, what is claimed as new and desired to be secured by Letters Patents of the United States is:

1. Apparatus for making a container from a sheet of material comprising a rotatable plate, a plurality of hollow mandrels freely carried by the plate and extending outwardly thereof, a longitudinally fluted spindle member slidably carried within the free end of each of the mandrels, means to extend the end of the spindle beyond the end of the mandrel, means to retract the spindle substantially within the mandrel, a loading station comprising means to wrap a length of sheet material upon a mandrel with a portion of said sheet material overlying the extended end of the spindle therein, means to overlap the margins of said sheet material, and means to seal the overlapped margins, a pre-forming station comprising a chamber receivable upon the spindle end of the mandrel and overlying the sheet material thereon, means to press the sheet material into contact with the fluted surface of the spindle, a fold-forming station comprising means to retract the spindle, means to rotate the mandrel and the preformed sheet material thereon, at least one roller adjacent the pre-formed end of the sheet material, means to urge the roller against the rotating pre-formed sheet material to fold it upon the underlying mandrel and spindle, whereby the sheet material assumes the shape of said mandrel and spindle, an outsert for the fold-formed end of the sheet material, means to urge the outsert upon the said fold-formed end, bonding means to secure the outsert to the sheet material so as to overlie the fold-formed and thereof and a closure station comprising means to thread a closure upon the outsert.

2. Apparatus according to claim 1 in which the spindle member is provided with an axial bore to freely receive therein an elongated pin.

3. Apparatus according to claim 2 in which the elongated pin extends outwardly of the end of the spindle in its retracted position.

4. Apparatus according to claim 1 in which the sheet material is a thin foil of fluid impervious material having a self-adhering layer on at least one side thereof.

5. Apparatus according to claim 4 in which the sheet layer is thermoplastic.

6. Apparatus according to claim 1 in which the preforming station includes a chamber, an elastomer ring carried within the chamber and a source of fluid under pressure between the chamber and the elastomer ring to force the said ring against the sheet material upon the spindle.

7. Apparatus according to claim 6 in which the chamber is a double walled chamber having an annular space between the walls to receive the fluid and the inner wall is provided with openings through which the fluid can reach the elastomer ring.

8. Apparatus according to claim 1 in which the fold forming station includes a second roller normal to the longitudinal axis of the mandrel directed at the formed material upon the mandrel where it extends beyond the said mandrel and overlies the spindle, whereby a step of reduced diameter is formed upon the formed sheet material.

9. Apparatus according to claim 3 in which the shape of the mandrel and spindle is that of a tapered shoulder portion and a cylindrical neck portion.

10. Apparatus according to claim 9 in which the outsert is formed with an externally threaded neck having a bore therein to receive the cylindrical neck portion of the formed sheet material, a tapered shoulder portion to overlie the shoulder of the formed sheet material and a depending skirt receivable upon the reduced step portion of the formed sheet material.

11. Apparatus according to claim 1 in which the sheet material is a thin foil of metal and the sealing means includes a strip of an an adhesive material.

12. Apparatus according to claim 1 in which the mandrels are non-circular in cross section.

13. Apparatus according to claim 1 in which the mandrels are tapered in the direction of their free ends.

14. Apparatus according to claim 9 in which the outsert is a hollow cylinder having an external thread and an axial bore to receive the neck portion of the fold-formed sheet material therein.

15. Apparatus according to claim 9 in which the outsert includes a tapered shoulder portion to overlie the shoulder of the fold-formed sheet material.

16. Apparatus according to claim 8 in which the outsert includes a depending skirt receivable upon the reduced step portion of the formed sheet material.

References Cited

UNITED STATES PATENTS

| 2,440,391 | 4/1948 | Bogoslowsky | 93—36.8 |
| 2,446,281 | 8/1948 | Harding | 156—294 X |
| 2,383,230 | 8/1945 | Voke | 156—218 X |
| 3,665,819 | 5/1972 | Gardner | 156—189 X |
| 3,567,546 | 3/1971 | Morris et al. | 156—446 X |

FOREIGN PATENTS

| 188,227 | 3/1964 | Sweden | 93—36.8 |

DOUGLAS J. DRUMMOND, Primary Examiner

B. J. LEWIS, Assistant Examiner

U.S. Cl. X.R.

156—69, 458, 535; 93—36.8